Jan. 8, 1957
B. L. SCHULMAN ET AL
APPARATUS FOR MEASURING THE FLOW
RATES OF PARTICULATE SOLIDS
Filed June 24, 1954
2,776,566
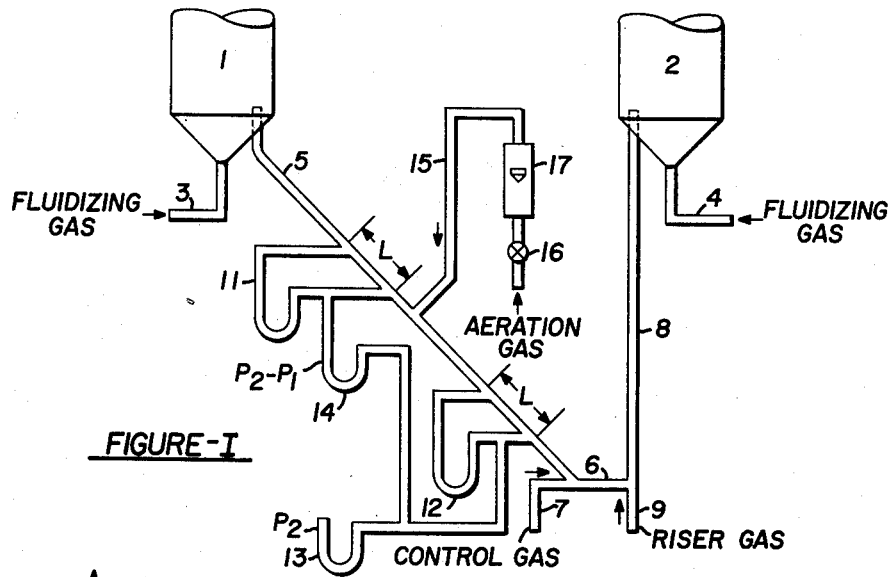
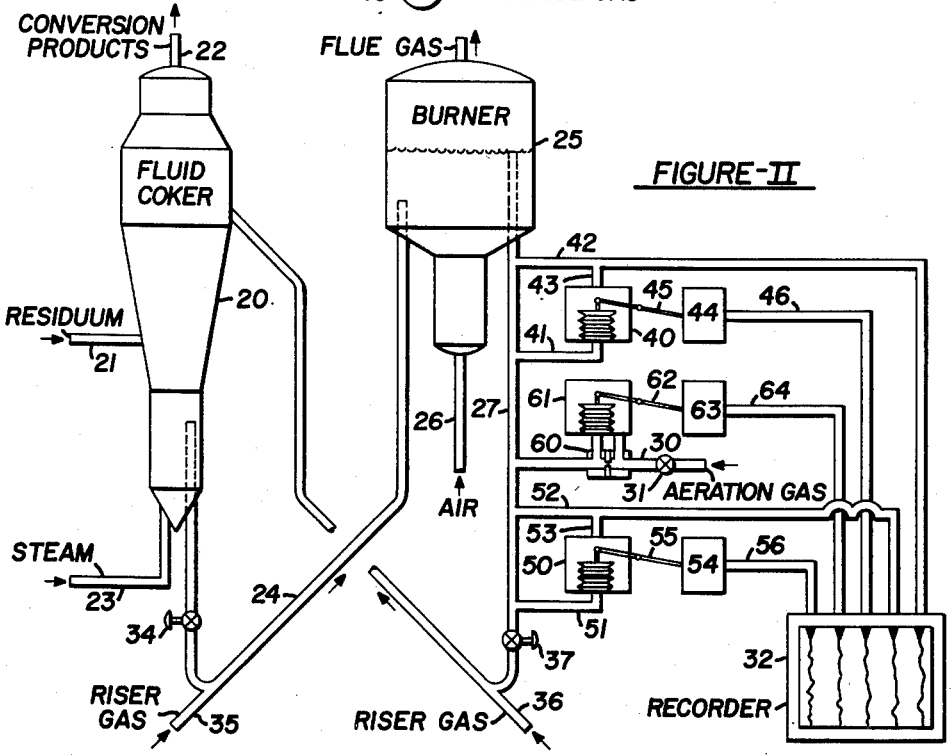
Bernard L. Schulman
Walter G. May
Inventors

United States Patent Office 2,776,566
Patented Jan. 8, 1957

2,776,566

APPARATUS FOR MEASURING THE FLOW RATES OF PARTICULATE SOLIDS

Bernard L. Schulman, Roselle, and Walter G. May, Union, N. J., assignors to Esso Research and Engineering Company, a corporation of Delaware Application June 24, 1954, Serial No. 439,120

4 Claims. (Cl. 73—205)

This invention relates to the handling of particulate solids, such as sand, cement, grains, pulverized coal, coke, charcoal and shale, comminuted ores, metals and refractory solids, etc. More particularly it is concerned with apparatus for metering the flow of particulate solids while they are being transported in an aerated state. This invention is particularly applicable to systems wherein fluidized solids are used in the treatment, production or conversion of hydrocarbons. Such conversion systems included fluid catalytic cracking processes, fluid residual oil coking processes, fluid hydroforming processes with or without shot circulation heating systems, etc.

Conversion processes of this type are generally carried out in two-vessel systems wherein the particulate solid is continuously circulated between a reaction zone and separate regeneration, heating or reactivation zone. The driving force commonly employed for circulating the particulate solid from one vessel to the other has been the fluistatic head generated by a relatively dense column of aerated solids in a standpipe. The standpipe is usually supplied with solids from the fluidized mass of solids contained within one of the vessels. Packie patent, U. S. 2,589,124, illustrates one form of solids transport system of the type mentioned.

In such particulate solid circulation systems, it is desirable to meter or measure the rate of flow of the solids. While the aerated solids have many of the characteristics of liquids, conventional liquid flow meters such as pressure differential meters, area meters, etc. do not perform well when applied to flowing solid-gas suspension. Such factors as erosion, compressibility of the gas, settling out of the solids, etc. make conventional metering devices impracticable or inoperative.

It is an object of the present invention to devise means for metering the rate of flow of aerated, flowing particulate solids. A more particular object is to measure the rate of flow of heat-carrying subdivided solids used in hydrocarbon oil conversion processes.

These and other objects and advantages of this invention will appear as this description proceeds and the attached drawings, forming a part of this specification, are described in detail. In the drawings:

Figure I depicts a simplified form of this invention applied to the metering of solids flowing in an inclined standpipe, Figure II shows the invention as used to measure the coke circulation rate in a hydrocarbon oil fluid coking system.

It is to be noted that the present invention is applicable only to the metering of a particulate solid-gas suspension when it is flowing in a substantially non-fluidized state. A nonfluidized condition exists in a solid-gas mixture when the relative velocity between gas and solid is less than that required to make the pressure gradient equal to the bulk density of the solids. In this condition, the bulk density of the solids is substantially not influenced by changes in the relative velocity of gas and solid. In contrast, when the relative velocity between gas and solid exceeds that required to make the pressure gradient equal to the bulk density, the solids are fluidized. The bulk density of fluidized solids generally varies with the relative velocity between solids and gas, and some gas is generally present in large "pockets" or "bubbles," wherein the solids density is very much less than the remainder of the mixture. Solids in a nonfluid condition in a standpipe have sometimes been called a moving fixed bed.

The limiting relative velocity between gas and solid dividing the nonfluid from the fluid state is dependent mainly on the size and particle density of the solid. Because of this, this invention is particularly applicable to solids suspensions wherein the solids have a particle size in the range of 40 to 1000 microns, by a screen analysis, and a true density above at least 50 pounds per cubic foot. With more finely divided solids, the solid particles agglomerate and pack readily. Also, it is difficult to achieve the nonfluid conditions necessary for the practice of this invention without using less than significant quantities of the aerating medium. In the practice of this invention, it is preferred to use materials that are relatively free flowing, i. e. are of relatively smooth, spherical shape. Particles that tend to pack or form large agglomerates oppose the uniform distribution of the aerating medium through the suspension. Relatively coarse solids are free flowing and will flow down a pipe without being fluid. One familiar example of this type of material is sand in an hour glass.

One type of solid meeting the above qualifications is the particulate petroleum coke customarily used in hydrocarbon oil fluid coking systems as a heat-carrying medium. Another type of solid is the "shot" used as the heat-carrying medium in certain fluid hydroforming systems.

In a solids circulation system wherein a pressuring standpipe is used, the required nonfluid condition will exist in the standpipe that contains the downwardly flowing solids. For this reason, it is preferred to measure the rate of solids flow in a standpipe.

Generally the objects of this invention are attained by injecting into a standpipe containing downwardly moving, aerated but nonfluid, solids sufficient amounts of an aerating medium to maintain the pressure gradients over two sections of the standpipe, above and below the point of injection of the aerating medium, equal. Knowing the manometer readings, the fluidization characteristics of the solids, the static pressure at each manometer and the rate of injection of the aerating medium, the solids flow rate can be computed simply and accurately.

Referring to Figure I, there is shown a conduit system that can be used to transport particulate solids from one reaction vessel 1 to another vessel 2. Reaction vessels 1 and 2 contain beds of particulate solids maintained in the fluidized condition in a manner well known by the art. Fluidizing gas is admitted to vessels 1 and 2 by lines 3 and 4 respectively. Solids are withdrawn from vessel 1 by line 5 and passed downwardly through inclined line 5 in a dense phase, non-fluid state. Line 5 is, preferably, not inclined more than 30° from the vertical as greater inclinations increase the pressure drop due to friction.

Control gas engages the solids at the base of conduit 5 to convey the solids through horizontal line 6. This control gas is admitted axially to line 6 by line 7. Line 6 is of sufficient length so that without the addition of control gas the solids will not flow, i. e., the angle of repose of the solids is not sufficient to span the distance between conduits 5 and 8. The solids emerging from conduit 6 are met with a riser gas supplied by line 9 which forces the solids upwardly through riser 8.

The vertical height of conduit 5 is sufficient to generate a fluid head that acts as a driving force to circulate the solids between the vessels and creates a pressure seal between vessels 1 and 2. This particular arrangement of an inclined standpipe 5 and a vertical riser 8 is particularly suited to the conveyance of relatively coarse solids, i. e., solids of about 200 to 800 microns in size. The flow of solids in this particular arrangement is characterized by its uniformity and smoothness.

The present invention is used to meter the solids flowing in conduit 5. This invention is depicted in its simplest form and more elaborate equipment may be used if desired. As shown, a manometer 11 is connected to the upper portion of conduit 5 to indicate a pressure gradient, i. e., a pressure drop, $\Delta P$, over a distance L. A similar manometer 12 is connected to the lower portion of conduit 5 to indicate another pressure gradient. A static pressure gauge 13, e. g., a manometer, is used to indicate the static pressure $P_2$ existing at the lower section. This pressure indicator may, of course, be used in conjunction with the upper manometer, if it is desired. Another pressure differential indicator 14 is used to attain the pressure gradient $P_2 - P_1$ over conduit 5 between the upper and lower sections. In place of pressure indicator 14, separate static pressure readings may, of course, be obtained for both the upper and lower sections.

Without the addition of additional aeration gas between the metering sections, the pressure gradients will be different. Aeration gas, in metered quantities, is admitted to conduit 5, by line 15 containing a control valve 16, in accordance with the teachings of this invention so that the pressure differential indicated by manometers 11 and 12 are substantially equal. The rate of gas addition via line 15 can be metered by any conventional means. Thus an inferential meter such as a differential pressure orifice or a rotameter can be used, or a volumetric meter such as a bellows meter or rotary bucket meter can be used. For example, a rotameter 17 can be used in line 15. The data obtained by these instruments are then related by the following equation to determine the velocity of the solids flowing in the standpipe.

$$V_s = l/E \left[ \frac{\Delta P}{KL} + \frac{P_2 U}{P_2 - P_1} \right]$$

It will be appreciated by those skilled in the art that these data may be collected by a controller and integrated to yield continuous readings of the solids flow rate.

The following explanation of the theory behind the equation that relates these factors is presented by way of illustration, although this invention is not to be limited thereby.

The pressure gradient of a gas flowing through a bed of particulate solids is a function of the relative velocity, $V_R$, of the gas to the solids. When there is no directional flow of the solids, the relative velocity is the same as the gas velocity through the bed. When the solids are moving downwardly, as in a standpipe, along with an aerating medium, the actual relative velocity, $V_{RA}$ is given by:

(1) $$V_{RA} = V_S - \frac{V_G}{E}$$

where:
$V_S$ = actual solid velocity
$E$ = fraction voids
$V_G$ = superficial gas velocity (based upon the empty pipe cross-section)

As $V_R = E V_{RA}$, the superficial relative velocity is:

(2) $$V_R = V_S E - V_G$$

As the solids move down the standpipe, the pressure buildup causes the accompanying gas to compress and this causes the gas velocity to decrease. The solids, however, do not expand or contract and, therefore, a decrease in $V_G$ results in an increase in $V_R$.

When a bed is non-fluid, the pressure gradient, $P/l$ ($P$ = a pressure drop over a unit of length, $l$), is directly proportional to $V_{RA}$, according to the Carman-Kozeny relation, i. e., (3) $$\frac{\Delta P}{l} = K V_R *$$

K being a proportionality factor. Therefore, the pressure gradient is higher near the bottom of the standpipe where the gas compression is the greatest.

If an aerating medium is injected into the standpipe, the value of $V_G$ is increased below the point of injection since normally, in most commercial designs, all the air goes down with the solids. As a result the pressure gradient below the injection point decreases. The pressure gradient above the injection point increases to keep the total pressure buildup at the base of standpipe constant, i. e., as the pressure at the base of the standpipe is fixed by the riser conditions, e. g., solids and gas flow rate, the standpipe will adjust itself to balance the conditions in the riser.

It is possible, then, to inject an aerating medium in sufficient quantities so that the pressure gradient becomes substantially equal over any two spaced sections of the standpipe, above and below the point of injection of the aerating medium. When the gradients are equal, the gas velocity, $V_G$, at each section is the same. Thus:

$$V_{G_2} = V_{G_1} \times \frac{P_1}{P_2} + U$$

where: $V_{G_1}$ and $V_{G_2}$ equal the gas velocities in the upper and lower sections, respectively; $P_1$ and $P_2$ equal the static pressures at the upper and lower sections respectively; and U equals the superficial gas velocity of the aerating medium injected to create the balance of pressure gradients, computed at pressure $P_2$.

Because $V_{G_1} = V_{G_2}$, then:

(4) $$V_{G_1} = \frac{P_2}{P_2 - P_1} \times U$$

and combining Equations 2, 3 and 4, the velocity of the solids is:

(5) $$V_S = l/E \left[ \frac{\Delta P}{KL} + \frac{P_2 U}{P_2 - P_1} \right]$$

where L is the length of either the upper or lower section, and $\Delta P$ is the pressure gradient over L.

K may be calculated from the above referred to Carman-Kozeny relation but is, preferably, determined experimentally for the particular solids and solid sizes used in the system. The value of K may change, particularly with changes in E, but the effect of a change in K in this analysis is relatively minor. E, the fraction voids, is determined or calculated considering the solids to be unaerated. This value may change somewhat when the solids are aerated, but generally the change is not appreciable, particularly with the coarse solids to which this invention is applied. U is determined from the measured quantity of aerating gas introduced into the standpipe to balance the pressure gradient over the upper and lower sections. The superficial velocity or flow of this quantity of gas in the standpipe is calculated at the conditions of the standpipe, assuming the standpipe to be empty, to arrive at the value of U.

The following example will serve to further illustrate this invention. Glass beads were circulated downwardly through a substantially vertical standpipe of 2" I. D. Air was used as the aerating medium. For these beads, $K = 970$ lbs.-sec./ft.⁴ and $E = 0.423$, which corresponds to a bulk density of 89 lbs./cu. ft. The taps for each manometer were located 1 ft. apart (L) and the manometers were 9 ft. apart. Without the addition of further amounts of aeration gas, the pressure gradients at the upper and lower sections, respectively, were 14.3 and 21.1 lbs./sq. ft./ft. In one run, 0.0080 S. C. F. M. (standard cu. ft./min.) of air was admitted to the standpipe be- ---
\* See Micromeritics, J. M. Dallavalle, p. 272, 1948, Pitman Publishing Company.

tween the manometers to balance the pressure drop over the upper and lower manometers at 18.3 lbs./sq. ft./ft. The quantity of air injected into the standpipe was converted by suitable calculations to superficial velocity in the standpipe to obtain the value for U. The static pressure at the lower manometer was 83.8 cm. Hg and at the upper manometer was 77.8 cm. Hg. From these data, the solids velocity was determined by Equation 5 to be 0.228 ft./sec. As a check, the beads flowing through the standpipe, under these conditions, were collected for a period of time and then weighed. From this, the actual solids velocity was determined to be 0.224 ft./sec., which is in good agreement with the result obtained by the method of this invention.

There is shown in Figure II a system for the pyrolytic conversion of hydrocarbon oils using the fluidizing solids technique. A heavy petroleum oil, e. g., a vacuum residuum, is injected into coking vessel 20 by line 21. Vessel 20 contains a fluidized bed of particulate coke having a size in the range of 40–800 microns by screen analysis. The particulate coke is maintained at a temperature in the range of 900° to 1600° F. The injected residuum upon contact with the high temperature coke undergoes pyrolysis evolving substantial quantities of lighter hydrocarbon vapors and depositing carbonaceous residue on the coke. The vapors, after having entrained solids removed, are taken off overhead by line 22 and are subjected to further treatment such as fractionation, catalytic cracking, etc. Steam is admitted to the base of vessel 20 by line 23 and serves first to strip the particulate coke in the lower portion of the vessel and then serves as a fluidizing gas.

To maintain the reaction temperature, coke is withdrawn from vessel 20 by line 24 and is circulated to a burner or combustion vessel 25. Air or other oxidizing gas is admitted to the base of burner 25 by line 26. This air serves to fluidize the coke particles contained in the burner and supports a partial combustion of the particles. This combustion raises the temperature of the particles 100° to 300° F. above the reaction temperature. The heated particles overflow into line 27 and are then conveyed to the coking vessel. Riser gas, e. g., steam is admitted by lines 35 and 36 to lines 24 and 27, respectively, to help convey the coke.

Valves 34 and 37 are placed in the lowermost portions of standpipes 24 and 27. These valves serve, in conjunction with the riser gas, to regulate the flow of the coke and also serve to create a sufficient pressure differential over the standpipe to prevent reversal of flow of the coke. This fluid coking process is known in the prior art and is used only for the purposes of illustration. No attempt is made to claim features of fluid coking and this invention is not to be limited thereby.

The present invention is used to determine the rate of flow of coke circulated between coking vessel 20, and burner 25. In accordance with this invention, a pressure differential indicator 40 is attached to the upper portion of standpipe 27 by line 41 and line 43, which branches off from line 42. A similar indicator 50 is attached to the lower portion of the standpipe by line 51 and line 53, which is attached to line 52. Indicators 40 and 50 can be of a bellows type construction. Aeration gas is admitted to the standpipe intermediate of these metered portions by line 30. The aeration gas is metered by an orifice flow meter 60 and accompanying indicator, also a bellows type, 61. The flow in line 30 is adjusted by valve 31.

To collect the various readings, a simple, conventional, multi-point recorder 32, well known in the art, is used to receive and record the various measurements. The static pressures from the upper and lower portions are transferred to recorder 32 by lines 42 and 52 respectively. The differential pressures are transmitted to recorder 32 by conventional telemetering devices. (See "Industrial Instruments for Measurement and Control"—Rhodes, page 372.) Thus, indicator 40 is connected by linkage 45 to a pneumatic telemeter 44. Indicator 50 is connected by linkage 55 to a pneumatic telemeter 54, and indicator 61 is connected by linkage 62 to a telemeter 63. The impulses from telemeters 44, 63 and 54 are transmitted to recorder 32 by lines 46, 64 and 56 respectively.

Sufficient aeration gas is added by line 30 to standpipe 27 so that the differential pressure readings of indicators 40 and 50 are equal. The various readings are then taken from recorder 32 and the rate of solids flow is determined therefrom in accordance with Equation 5. Equation 5 calls for the pressure differential, $P_2-P_1$. This can be obtained by subtracting the reading given by line 42 from the reading given by line 52.

It is important that the aeration gas be uniformly dispersed throughout the continium by the time it reaches the lower metering section. To insure this, the aeration gas can be admitted at a plurality of circumferential and vertical points along the standpipe.

While this invention has been described as applied to the metering of a solids-gas suspension moving downwardly in a standpipe, it will be apparent to those skilled in the art that the invention is applicable to situations where the gas flow is reversed, i. e., either the gas or the gas and the solids are moving upwardly or to a zone of lower pressure. In such a case, the aerating gas expands instead of being compressed and it is necessary to extract or remove a portion of the aerating gas between two metering sections in order to have the pressure gradients over the metering sections equal. The solids flow rate can be related to the amount of extracted gas in accordance with Equation 5.

Various means may be used to increase the efficiency of the upper and lower metering sections. Thus, instead of using a straight length of pipe to create a pressure gradient, venturi shapes at each of the metering sections may be used to increase the magnitude of the pressure gradient. Also, it is to be appreciated that the sensitivity of this method of metering is increased by increasing the solids velocity.

In most petroleum processes using the fluidized solids technique, control of the solids flow rate is not essential as is the control of other variables, e. g., the temperature of the reactor. It is usually sufficient to determine only the rate of flow of the solids. It will be appreciated, however, that the indication of the solids flow rate obtained by the method of this invention can be transformed, by suitable means, e. g., a controller, into a control impulse. This control impulse can then be used to control the rate of flow of the solids in the standpipe, e. g., by operating valve 37, or other processing variables. Other variations of this invention will be readily apparent to those skilled in the art.

Having described the invention, what is sought to be protected by Letters Patent is set forth in the following claims.

What is claimed is:

1. Apparatus for determining the rate of flow of aerated non-fluidized particulate solids wherein said solids flow as a confined stream in an elongated conduit in a direction of increasing pressure, said rate being determined by introducing a metered quantity of aerating gas between spaced equal portions of length L of said elongated conduit to equalize the pressure gradients, $\Delta P/L$, over said portions, while concurrently securing the pressure differential, $P_2-P_1$, between said portions and the static pressure at one of said portions, and relating the measurements to obtain said rate according to the formula:

$$V = 1/E \frac{\Delta P}{KL} + \frac{P_2 U}{P_2 - P_1}$$

wherein:

V is the velocity of said solids
E is the fraction voids of the aerated suspension
ΔP is the pressure drop over the distance L
K is a proportionality factor
$P_2$ is the static pressure at the portion downstream of the point of aeration gas admission
$P_2 - P_1$ is the pressure differential between said portions
U is the superficial velocity of said aerating gas in said conduit at said $P_2$ pressure, obtained from said metered quantity comprising in combination, an aerating gas inlet conduit for admitting an aerating gas to said elongated conduit, gas flow rate exhibiting means connected with said aerating gas inlet conduit and operative for measuring said metered quantity, a first pressure gradient exhibiting means connected to a portion of said elongated conduit of said length L upstream of said aerating gas inlet conduit, a second pressure gradient exhibiting means connected to a portion of said elongated conduit also of said length L downstream of said aerating gas inlet conduit, said pressure gradient exhibiting means being operative to measure said pressure gradients, pressure differential exhibiting means connected to said portions and operative to measure said pressure differential, and static pressure exhibiting means connected to one of said portions and operative to measure said static pressure.

2. The apparatus of claim 1 wherein said exhibiting means are connected in a unitary system and include a single recording means operative to individually record said pressure gradients, static pressure and metered quantity.

3. The apparatus of claim 1 wherein said exhibiting means include a primary device comprising two sets of differential pressure taps connected to said portions, and secondary indicating devices connected by pressure leads to said differential pressure taps.

4. Apparatus for measuring the velocity of aerated particulate solids flowing downwardly through a standpipe comprising, in combination, a gas inlet conduit intermediate of the ends of said standpipe, a gas flow meter connected to said gas inlet conduit responsive to the quantity of gas admitted to said standpipe through said gas inlet conduit, a first pressure gradient exhibiting means connected to an upper portion of said standpipe upstream of said gas inlet conduit, a second pressure gradient exhibiting means connected to a lower portion of said standpipe downstream of said gas inlet conduit, said upper and lower portions being of equal length and said pressure gradient exhibiting means being responsive to the pressure gradients over said portions, pressure differential exhibiting means connected to said upper and lower portions responsive to the pressure differential therebetween, and static pressure exhibiting means connected to one of said portions responsive to the static pressure at that portion.

References Cited in the file of this patent
UNITED STATES PATENTS

| | | |
|---|---|---|
| 1,677,691 | Smith | July 17, 1928 |
| 2,439,723 | Engdahl | Apr. 13, 1948 |